Nov. 12, 1968  G. CLARKE  3,410,148
GEAR MECHANISMS
Filed Feb. 2, 1967  2 Sheets-Sheet 2
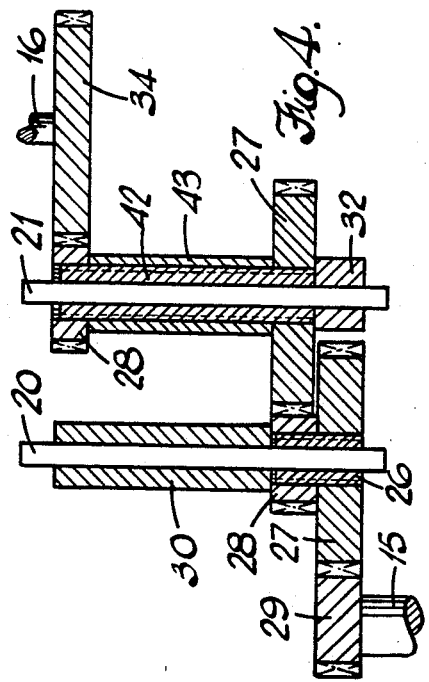
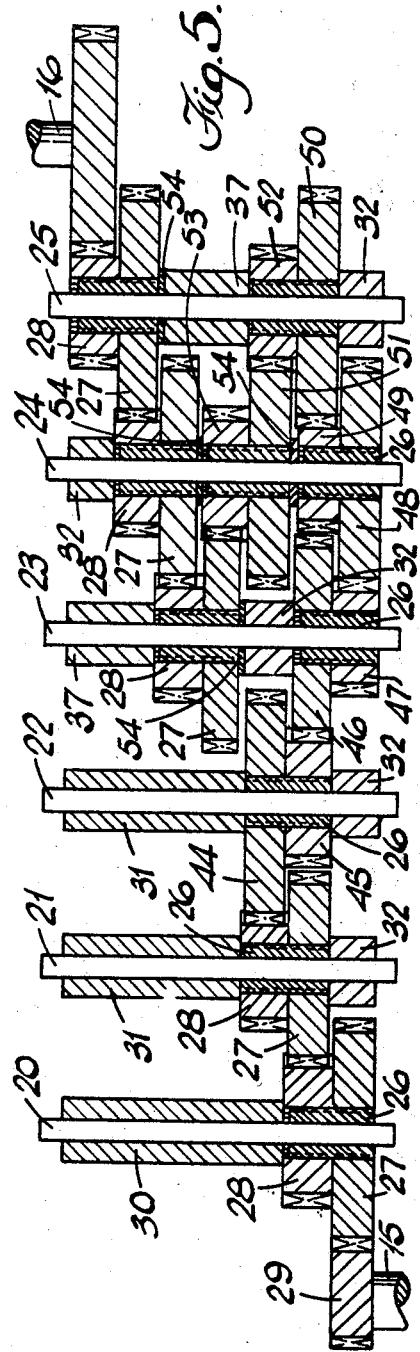

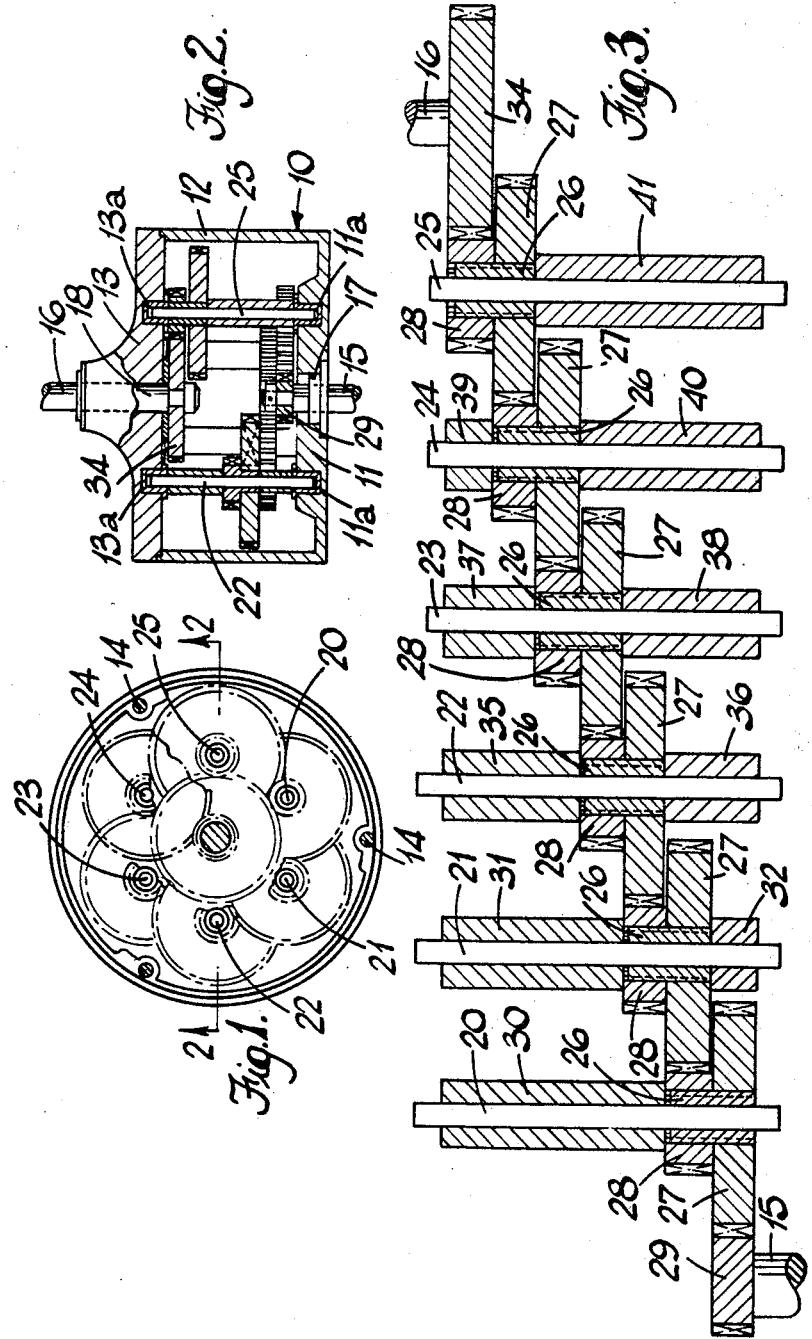

United States Patent Office 3,410,148
Patented Nov. 12, 1968

3,410,148
GEAR MECHANISMS
George Clarke, Selly Oak, England, assignor to Clarke Olsen (Gears) Limited, Selly Oak, England
Filed Feb. 2, 1967, Ser. No. 613,661
Claims priority, application Great Britain, Mar. 1, 1966, 8,972/66
5 Claims. (Cl. 74—331)

ABSTRACT OF THE DISCLOSURE

A reduction gear box is provided in which successive reduction stages are obtained by spur gear/pinion combinations arranged on equally spaced axes around coaxial input and output shafts. Each spur gear/pinion combination consists of a loose spindle, spacing sleeves locating the spur gear/pinion on the spindle for rotation relative thereto and means which drivingly interconnect the spur gear and pinion. The spur gear and the pinion are separately removable to allow wide variation of ratio.

---

This invention relates to gear mechanisms. It is an object of the invention to provide a gear mechanism in a form in which the reduction ratio of the mechanism can be readily varied over a wide range.

A gear mechanism in accordance with the invention comprises a housing, an input shaft and an output shaft extending into the housing from opposite ends and rotatable about a common axis, a plurality of spindles, carried by the housing disposed at equal distances from and parallel to the input and output shafts and spaced apart at angles of 60° around the common axis of the input and output shafts, a pinion and a spur gear associated with each of the spindles, said pinion and said spur gear being independently removable from the associated spindle, means drivingly interconnecting the pinion and the spur gear on each spindle, and permitting rotation thereof relative to the spindle, a pinion and a spur gear mounted respectively on the input shaft and the output shaft and meshing respectively with a spur gear on one of the spindles and a pinion on the other of the spindles, and removable spacing means mounted on the spindles for axially locating the pinions and spur gears in a manner to provide a drive between the input shaft and the output shaft.

Reference will now be made to the accompanying drawings in which:

FIGURE 1 is a plan view of one example of a gear mechanism in accordance with the invention with a part of its housing removed, FIGURE 2 is a section on the line 2—2 in FIGURE 1, FIGURE 3 is a developed view of the full gear train, FIGURE 4 is a developed view of a minor modification of the gear mechanism, and FIGURE 5 is a developed view of another modification of the gear mechanism.

Referring to the drawings, the gear mechanism includes a housing 10 which consists of an end wall 11, a cylindrical side wall 12, and a removable cover 13 engaged with the end of the side wall 12 remote from the end wall 11. The cover 13 is held in position by screws 14 engaged in screw-thread lugs within the cylindrical wall portion 12. An input shaft 15 and an output shaft 16 are respectively rotatably mounted in bearings defined by plain bores 17, 18 in the end wall 11 and the cover 13 respectively. Alternatively the input shaft may be the shaft of an electric motor to which the housing 10 is secured.

Six fixed spindles 20 to 25 are disposed at equi-angular intervals around the common axis of the shafts 15, 16 and are respectively carried in mountings 11a and 13a in the end wall 11 and the cover 13 respectively. These spindles 20 to 25 are of plain circular cross-section. It will be noted that each of the spindles is equidistant from its two neighbouring spindles, and from the shafts 15 and 16.

Each of the spindles 20 to 25 has rotatably and removably mounted thereon a bush 26 having a spur gear 27 and a pinion 28 in removably splined engagement with its external surface so that the pinion and the spur gear are drivingly coupled together through the bush. The input shaft 15 carries a pinion 29 which meshes with the spur gear 27 carried by a spindle 20. The assembly of pinion 28, spur gear 27 and bush 26 on shaft 20 is located axially by a sleeve 30. The pinion 28 on the spindle 20 drives the spur gear 27 on the spindle 21 which in turn drives the bush 26 and a pinion 28 on the spindle 21, the assembly 26, 27, 28 on the spindle 21 is located axially by spacing sleeves 31, 32. In this manner the drive is transmitted from the input shaft 15 through the spur gears 27, the bush 26 and the pinion 28 on the spindles 20 to 25 in turn. The pinion 28 on the spindle 25 meshes with a spur gear 34 secured on the output shaft 16. The assembly of the spur gear 27, the bush 26 and the pinion 28 is actually located on spindle 22 by sleeves 35, 36, on spindle 23 by spacing sleeves 37, 38 on spindle 24 by spacing sleeves 39 and 40, and on spindle 25 by a single spacing sleeve 41.

In the arrangement shown, each of the pinions 28 and 29 is of the same diameter. In addition, each of the gear wheels 27, 34 is of a larger diameter. If desired, however a different reduction ratio between a given pinion 28 and the meshing spur gear 27 may be employed. It is only necessary that the sum of the pitch radii of a pinion and the spur gear with which it meshes should be constant and equal to the spacing of the axes of the spindles 20 to 25, and the spacing of the axes thereof from the common axis of the shafts 15, 16.

It is also possible to use an arrangement in which there are fewer than six reduction steps (as shown in FIGURE 4) or more than six reduction steps (as shown in FIGURE 5).

In the arrangement shown in FIGURE 4, there are only two reduction steps. In this case, only the spindles 20 and 21 are employed. The arrangement of the spur gear 27, the pinion 28 and the spacing sleeve 30 on the spindle 20 is the same as before. However, in order to make the pinion 28 on spindle 21 mesh with the spur gear 34 on the output shaft 16, the pinion 28 is raised to occupy the same position as the pinion 28 previously employed on the spindle 25. To provide a driving connection between the spur gear 27 and the pinion 28 on the spindle 21, an elongated bush 42 is employed. This bush 42 is of the same cross-sectional shape as the bushes 26 but its length is equal to the sum of the lengths of a bush 26 and the sleeve 31. An additional spacing sleeve 43 of the same length as the sleeve 31 surrounds the bush 42 and engages the spur gear 27 and the pinion 28 at opposite ends.

In the arrangement illustrated by FIGURE 5 there are eleven reduction stages altogether. The additional reduction stages are obtained by utilizing two or more independently rotatable bushes 26 on certain of the spindles. Thus, the arrangement of spindles 20 and 21, as shown, is the same as shown in FIGURE 1. In the case of spindle 22, however, the spur gear 44 and the pinion 45 occupy the same axial positions relative to the spindle as are occupied by the pinion 28 and the spur gear 27 respectively on the spindle 21. Thus, sleeves 31, 32 are used to hold the assembly of the bush 26, the spur gear 44 and the pinion 45 in the correct axial position. Spindle 23 has two bushes 26.

One of these is arranged at the same axial level as the bush 26 on spindle 20, and carries a spur gear 46 engaged with the pinion 45, and a pinion 47 at the same axial level as the pinion 29 on the input shaft 15. The other bush on spindle 23 occupies the same axial position as it does in the arrangement shown in FIGURE 1, and the drive connection from the pinion 28 on the bush 26 to the spur gear 34 on the output shaft 16 is the same as shown in FIGURE 1.

In the case of spindle 24 there are three bushes 26, one of which is in the same position as the bush 26 on spindle 20, a second of which is in the same position as the bush 26 on spindle 22 in FIGURE 1, and the last of which is in the normal position for a bush on spindle 24. On the first of three bushes is a spur gear 48 engaging the pinion 47 on spindle 23, and a pinion 49 engages a spur gear 50 on an additional bush 26 on the spindle 25. The bush 26 on spindle 25 is at the same level as the bush 26 on spindle 21. The second of the bushes 26 on spindle 24 carries a spur gear 51 which is engaged by a pinion 52 on the bush 26 on spindle 25, and a pinion 53 meshed with the spur gear 27 on the spindle 23.

Where there are more than one pinion spur gear bush assembly on any given spindle these will be separated by spacers and/or washers 54. All the washers 54 are identical and these may be used singly, as on spindle 23 or in pairs as on spindle 24.

It will thus be seen that the gear mechanism described above allows for a very wide range of gear ratios to be obtained without necessitating the storage of large numbers of different parts. All the spindles 20 to 25 are identical, all the bushes 26 are identical, and there are only five different lengths for the spacing sleeves. Apart from these components and the special bushes and spacing sleeves shown in FIGURE 4, only the gear elements need to be stored. Since the spur gears and the pinions are separate from one another, and separate from the bushes 26, it is not necessary for large numbers of combinations of spur gear/pinions to be stored.

Where the input shaft 15 is rotatably mounted in a bearing in the end of the housing the latter may be provided with feet, so that the mechanism can be used as a free standing unit. Any suitable form of coupling can be employed for connecting the input and output shafts to a drive and a load respectively.

In the case of a unit in which the input shaft is formed by an electric motor shaft the base 11 of the housing would be adapted for direct connection to the electric motor housing.

It will be noted that all the pinions are of equal thickness, whilst all the spur gears are of a smaller equal thickness. Furthermore the bushes 26 are shorter than the combined thickness of a spur gear and a pinion so that it is the thickness only of the gears and the spacers which needs to be gauged accurately during manufacture to ensure that the total axial lengths of the components on the spindles are equal.

Having thus described my invention what I claim as new and desire to secure by Letters Patent is:

1. A gear mechanism comprising a housing, an input shaft and on output shaft extending into the housing from opposite ends and rotatable about a common axis, a plurality of spindles carried by the housing disposed at equal distances from and parallel to the input and output shafts and spaced apart at angles of 60° around the common axis of the input and output shafts, a pinion and a spur gear associated with each of the spindles, said pinion and said spur gear being independently removable from the associated spindle, means drivingly interconnecting the pinion and the spur gear on each spindle, and permitting rotation thereof relative to the spindle, a pinion and a spur gear mounted respectively on the input shaft and the output shaft and meshing respectively with a spur gear on one of the spindles and a pinion on the other of the spindles, and removable spacing means mounted on the spindle for axially locating the pinions and spur gears in a manner to provide a drive between the input shaft and the output shaft.

2. A gear mechanism as claimed in claim 1 in which said means drivingly interconnecting the pinion and the spur gear on each spindle comprises a bush rotatably mounted on the spindle and non-rotatably coupled to the pinion and spur gear.

3. A gear mechanism as claimed in claim 2 in which the bush is externally splined and the pinion and the spur gear have coacting splined holes.

4. A gear mechanism as claimed in claim 3 in which the pinion which engages the spur gear mounted on the output shaft is spaced from the spur gear on the associated spindle, the associated bush being of elongated form and a spacing sleeve encircling said bush between the pinion and the associated spur gear.

5. A gear mechanism as claimed in claim 3 in which at least some of the spindles have independently rotatable thereon a plurality of sub-assemblies each comprising a spur gear, a pinion, and a bush drivingly interconnecting the spur gear and the pinion.

References Cited

UNITED STATES PATENTS 3,358,525   12/1967   Clarke _____ 74—331

FRED C. MATTERN, Jr., *Primary Examiner.*

H. S. LAYTON, *Assistant Examiner.*